United States Patent
Comer et al.

(10) Patent No.: US 8,160,140 B2
(45) Date of Patent: Apr. 17, 2012

(54) METHOD AND APPARATUS FOR TRANSMITTING MULTIPLE VIDEO STREAMS OVER A VIDEO CHANNEL

(75) Inventors: Mary Lafuze Comer, Fairmount, IN (US); Gregory William Cook, Lafayette, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 1120 days.

(21) Appl. No.: 11/989,360

(22) PCT Filed: Jul. 27, 2006

(86) PCT No.: PCT/US2006/029739
§ 371 (c)(1),
(2), (4) Date: Jan. 24, 2008

(87) PCT Pub. No.: WO2007/014384
PCT Pub. Date: Feb. 1, 2007

(65) Prior Publication Data
US 2009/0135906 A1 May 28, 2009

Related U.S. Application Data

(60) Provisional application No. 60/703,156, filed on Jul. 28, 2005.

(51) Int. Cl.
*H04B 1/66* (2006.01)
(52) U.S. Cl. .............................. 375/240.12; 375/240.26
(58) Field of Classification Search ............. 375/240.12; 348/415; 725/81
See application file for complete search history.

(56) References Cited

U.S. PATENT DOCUMENTS

| 5,745,181 | A * | 4/1998 | Wilkinson | 375/240.15 |
| 6,704,359 | B1 * | 3/2004 | Bayrakeri et al. | 375/240.12 |
| 2006/0095944 | A1 * | 5/2006 | Demircin et al. | 725/81 |
| 2007/0165715 | A1 * | 7/2007 | Yoshinari | 375/240.12 |

FOREIGN PATENT DOCUMENTS

| WO | WO9529546 | 11/1995 |
| WO | WO0041395 | 7/2000 |
| WO | WO2004047444 | 6/2004 |
| WO | WO2006057938 | 6/2006 |

OTHER PUBLICATIONS

Wang, L. et al.: "Bit Allocation for Joint Coding of Multiple Video Programs," 1997 IEEE International Symposium on Circuits and Systems, Jun. 9-12, 1997, Hong Kong, vol. 2, pp. 1265-1268, XP010236446.

(Continued)

*Primary Examiner* — Kwang B Yao
*Assistant Examiner* — Syed M Bokhari
(74) *Attorney, Agent, or Firm* — Robert D. Shedd; Paul P. Kiel; Guy H. Eriksen

(57) ABSTRACT

There are provided methods and apparatus for transmitting multiple video streams over a video channel. A video encoder is provided for encoding a plurality of streams corresponding to a plurality of programs. The video encoder includes an encoder (300) for encoding each of the plurality of streams for transmission over a communication channel. The encoder imposes a relative positioning on intra-coded frames among the plurality of programs to meet individual stream delay requirements corresponding to the plurality of streams.

8 Claims, 2 Drawing Sheets

OTHER PUBLICATIONS

Ribas-Corbera, J. et al.: "A Generalized Hypothetical Reference Decoder for H.264/AVC," IEEE Transactions on Circuits and Systems for Video Technology, vol. 13, No. 7, pp. 674-687, Jul. 2003.

Ribas-Corbera, J. et al.: "Rate Control in DCT Video Coding for Low-Delay Communications," IEEE Transations on Circuits and Systems for Video Technology, vol. 9, No. 1, pp. 172-185, Feb. 1999.

Su, Guan-Ming et al.: "Efficient Bandwidth Resource Allocation for Low-Delay Multiuser MPEG-4 Video Transmission," Proceedings of the 2004 IEEE International Conference on Communications, vol. 3, pp. 1308-1312, Jun. 20-24, 2004.

Wang, L. et al.: "Bit Allocation and Constraints for Joint Coding of Multiple Video Programs," IEEE Transations on Circuits and Systems for Video Technology, vol. 9, No. 6, pp. 949-959, Sep. 1999.

Boroczky, L. et al.: "Joint Rate Control with Look-Ahead for Multi-Program Video Coding," IEEE Transations on Circuits and Systems for Video Technology, vol. 10, No. 7, pp. 1159-1163, Oct. 2000.

International Search Report, dated Feb. 28, 2007.

* cited by examiner

METHOD AND APPARATUS FOR TRANSMITTING MULTIPLE VIDEO STREAMS OVER A VIDEO CHANNEL

CROSS-REFERENCE TO RELATED APPLICATIONS

This application claims the benefit, under 35 U.S.C. §365 of International Application PCT/US2006/029739 filed Jul. 27, 2006, which was published in accordance with PCT Article 21(2) on Feb. 1, 2007 in English and claims priority of U.S. Provisional patent application No. 60/703,156 filed Jul. 28, 2005.

FIELD OF THE INVENTION

The present invention relates generally to video encoding and, more particularly, to methods and apparatus for encoding multiple video streams for transmission over a video channel.

BACKGROUND OF THE INVENTION

When multiple video programs are transmitted over a single channel, the channel bandwidth can be used more efficiently by implementing a joint rate controller to allocate bits among the programs, instead of performing rate control independently for each program. With joint rate control, bits are allocated so that the total bitrate over all the programs meets the channel bandwidth limitations. Normally, there is very little restriction on how bits are distributed within a group of pictures (GOP), but this is not the case if there is a low delay constraint. To achieve low delay, both the total number of bits for a GOP and the distribution of those bits across the GOP must be constrained.

SUMMARY OF THE INVENTION

These and other drawbacks and disadvantages of the prior art are addressed by the present invention, which is directed to methods and apparatus for encoding multiple video streams for transmission over a video channel.

In accordance with the principles of the present invention, there is described a method and apparatus for video encoding a plurality of streams corresponding to a plurality of programs. The apparatus includes an encoder for encoding a plurality of streams for transmission over a communication channel. The encoder imposes a relative positioning on intra-coded frames among the plurality of programs to meet individual stream delay requirements corresponding to the plurality of streams.

These and other aspects, features and advantages of the present invention will become apparent from the following detailed description of exemplary embodiments, which is to be read in connection with the accompanying drawings.

BRIEF DESCRIPTION OF THE DRAWINGS

The present invention may be better understood in accordance with the following exemplary figures, in which.

DETAILED DESCRIPTION

Figure 1:
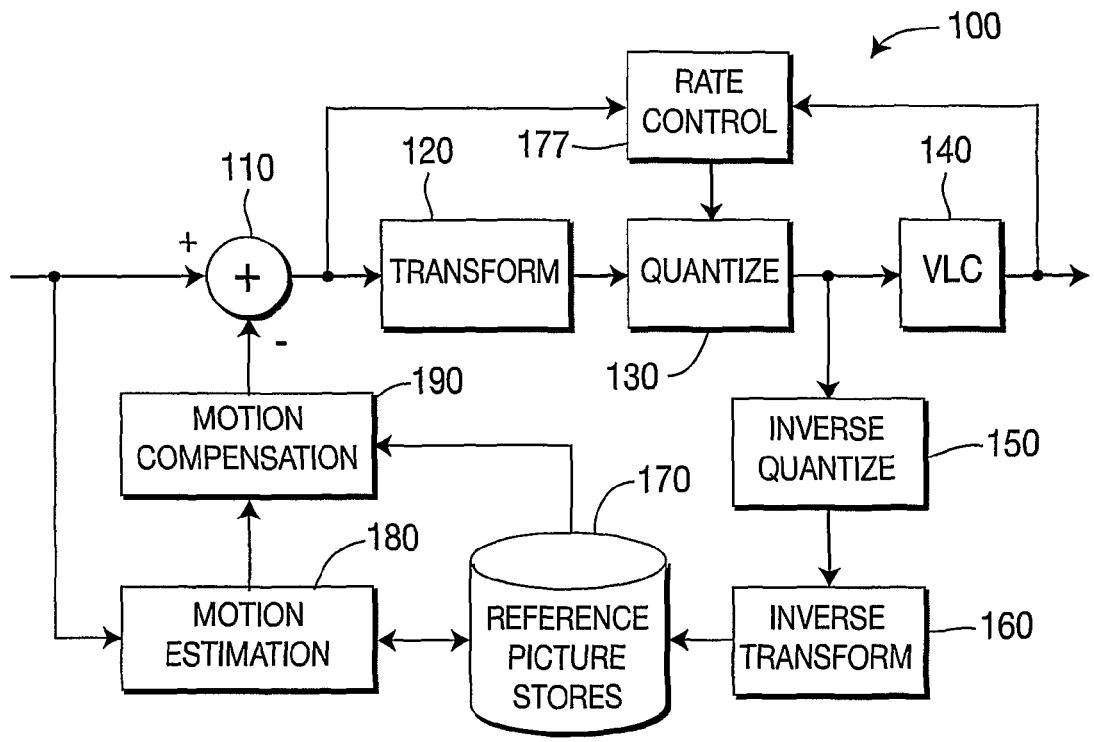
FIG. 1 is a block diagram for an exemplary video encoder to which the present principles may be applied, in accordance with an embodiment of the present invention.

The present invention is directed to methods and apparatus for encoding multiple video streams for transmission over a video channel. Advantageously, the present invention addresses the problem of simultaneously controlling the bitrate and the delay in a multiprogram application using joint rate control. In an embodiment, the present invention utilizes low-delay joint rate control to efficiently allocate bits during the encoding of non-scalable video streams.

The present description illustrates the principles of the present invention. It will thus be appreciated that those skilled in the art will be able to devise various arrangements that, although not explicitly described or shown herein, embody the principles of the invention and are included within its spirit and scope.

All examples and conditional language recited herein are intended for pedagogical purposes to aid the reader in understanding the principles of the invention and the concepts contributed by the inventor to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

Turning to FIG. 1, an exemplary video encoder to which the present principles may be applied is indicated generally by the reference numeral 100. An input to the encoder 100 is connected in signal communication with a non-inverting input of a summing junction 110. The output of the summing junction 110 is connected in signal communication with a block transformer 120. The transformer 120 is connected in signal communication with a first input of a quantizer 130. The output of the quantizer 130 is connected in signal communication with a variable length coder ("VLC") 140, where the output of the VLC 140 is an externally available output of the encoder 100. A first input of a rate controller 177 is provided from the output of the summing junction 110, a second input of the rate controller 177 is provided from the output of the VLC 140, and an output of the rate controller 177 is connected in signal communication with a second input of the quantizer 130.

The output of the quantizer 130 is further connected in signal communication with an inverse quantizer 150. The inverse quantizer 150 is connected in signal communication with an inverse block transformer 160, which, in turn, is connected in signal communication with a reference picture store 170. A first output of the reference picture store 170 is connected in signal communication with a first input of a motion estimator 180. The input to the encoder 100 is further connected in signal communication with a second input of the motion estimator 180. The output of the motion estimator 180 is connected in signal communication with a first input of a motion compensator 190. A second output of the reference picture store 170 is connected in signal communication with a second input of the motion compensator 190. The output of the motion compensator 190 is connected in signal communication with an inverting input of the summing junction 110.

As noted above, the present principles are advantageously directed to encoding and transmitting multiple video streams over a single channel with a low delay constraint. The joint rate controller allocates bits to each frame of each program in a way that meets constraints on the total channel bandwidth and individual program delays, while not allowing any individual coding buffer to overflow or underflow.

In an embodiment, intra-coded (I) pictures/frames, which tend to be larger than inter-coded (P, B) pictures/frames, are staggered from one program to the next to help meet the low delay requirement. Compared to the case with no delay constraint, there is a much tighter bound on the peak size of each individual coded picture when low delay is required. For this reason, it is advantageous to have the I frames, which are generally significantly larger than motion compensated P and B frames, occur at different times for different programs. A conventional rate control method has been proposed that allows I frames to be at different times for different programs. However, unlike the principles associated with embodiments of the present invention, the conventional rate control method does not impose a relative positioning of I frames. This is because, unlike the present invention, the conventional rate control method does not attempt to constrain delay.

Figure 2:
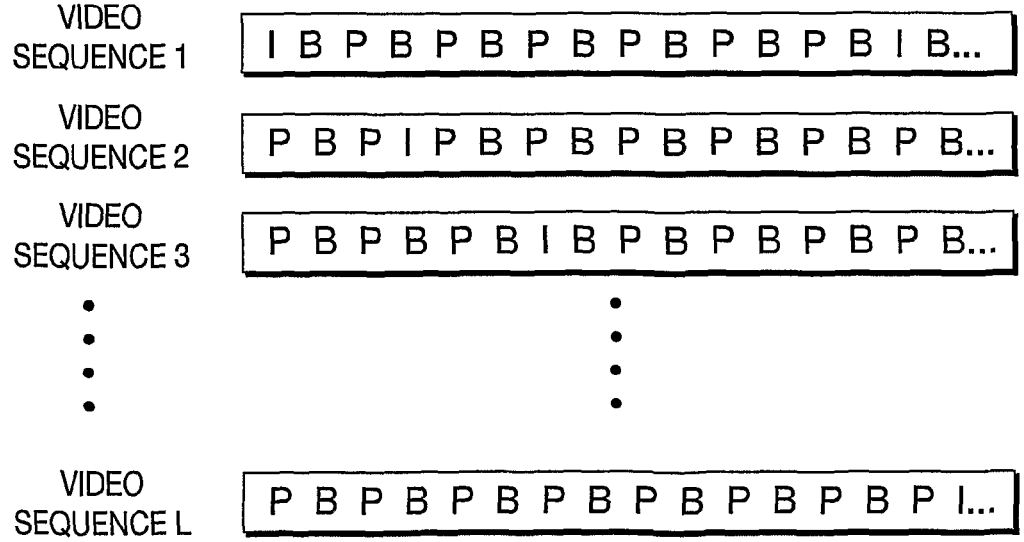
FIG. 2 is a diagram for exemplary video streams, in accordance with an embodiment of the present invention.

Turning to FIG. 2, exemplary video streams in accordance with the principles of the present invention are indicated generally by the reference numeral 200. In particular, FIG. 2 illustrates the group of pictures (GOP) structures of the L programs for the case where each program uses the GOP pattern IBPBP, and I frames are spread evenly such that a minimum number of I frames appear at any specific moment in time. That is, the I frames are positioned so as to not exceed a pre-specified threshold number of I frames at a given time across the L programs.

Figure 3:
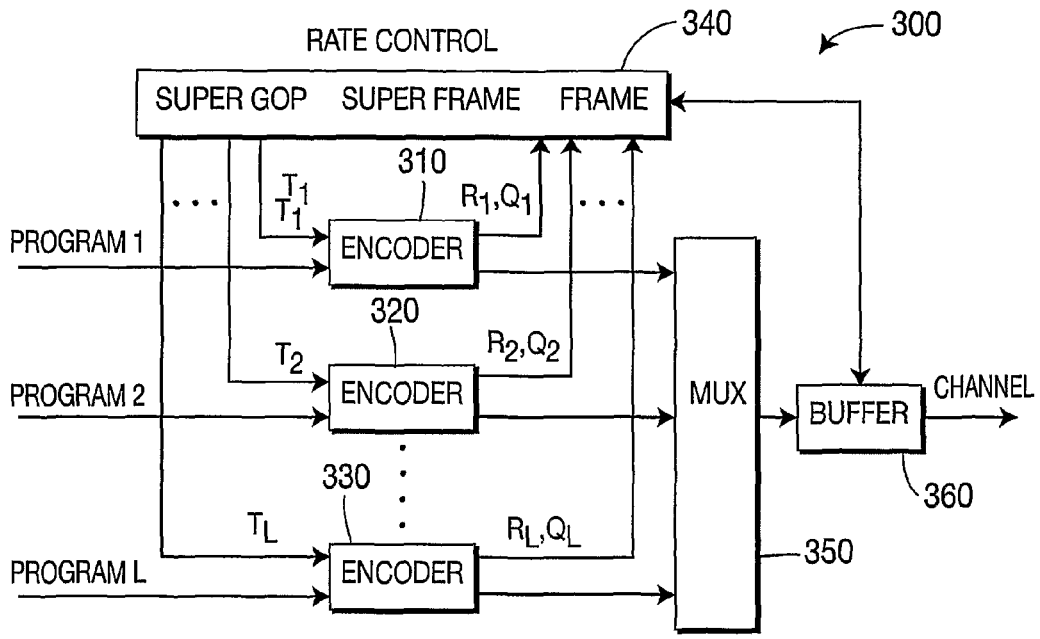
FIG. 3 is a diagram for an exemplary joint coding system to which the present principles may be applied, in accordance with an embodiment of the present invention.

Turning to FIG. 3, an exemplary joint video coding system to which the principles of the present invention may be applied is indicated generally by the reference numeral 300. The joint video coding system 300 may include one or more encoders such as that shown and described with respect to FIG. 1. It is presumed that there are L programs which can be jointly coded for a particular channel bandwidth. In FIG. 3, T represents a target number of bits from a rate controller 340, R represents a resulting number of compressed bits, and Q represents an average quantization parameter.

The joint video coding system 300 includes an encoder 310, an encoder 320, an encoder 330, the rate controller 340, a multiplexer (MUX) 350, and a buffer 360.

First inputs of the encoders 310, 320, and 330 are available as inputs to the joint coding system 300. First, second, and third outputs of the rate controller 340 are connected in signal communication with second inputs of the encoders 310, 320, and 330, respectively. First outputs of the encoders 310, 320, and 330 are respectively connected in signal communication with first, second, and third inputs of the rate controller 340. Second outputs of the encoders 310, 320, and 330 are respectively connected in signal communication with first, second, and third inputs of the multiplexer 350.

An output of the multiplexer 350 is connected in signal communication with a first input of the buffer 360. A bidirectional input/output of the rate controller 340 is connected in signal communication with a bidirectional input/output of the buffer 360. An output of the buffer 360 is available as an output of the joint video coding system 300.

A description will now be given regarding an exemplary embodiment illustrating the principles of the present invention, followed by a further description thereof with respect to FIG. 4.

As noted above, it is presumed that there are L programs which can be jointly coded for a particular channel bandwidth. To determine the target bit allocation for each frame, the bit allocation algorithm operates in a hierarchical fashion. First, a super GOP is created, which includes a GOP from each program. For illustrative purposes, it is presumed that the GOP size for each stream is N. Next, a target bit allocation, T(n), for each super frame (where each super frame is a set of frames that includes a frame from each of the L programs taken at the same time instant (i.e., having the same time index), each of the frames included in a super frame being also included in a corresponding super group of pictures) is calculated as follows:

$$T_n = \frac{\sum_{l=1}^{L} \frac{1}{K_{1,n,t}} C_{1,n,t}}{\sum_{l=1}^{L}\left[N_{1,I}\frac{C_{l,I}}{K_I} + N_{1,P}\frac{C_{1,P}}{K_P} + N_{1,B}\frac{C_{1,B}}{K_B}\right]} T_r \quad (1)$$

where the following designations apply: I is the number of the program (1 to L); n is the frame position in the GOP (0 to N−1); t is the picture type, {I, P, B}, and is a function of n and I, i.e., t=t(n,I); C(I,n,t) is the complexity measure for frame n; K(I,n,t) is the picture type compensation factor, {K(I), K(P), K(B)}; N(I,I), N(I,P), N(I,B) are the remaining number of I, P, B pictures, respectively; and T(r) is the number of remaining bits.

One can compute the target bit allocation for a program, T(I,n), via the following formula:

$$T_{l,n} = \frac{\frac{1}{K_{l,n,t}} C_{l,n,t}}{\sum_{l=1}^{L} \frac{1}{K_{l,n,t}} C_{l,n,t}} T_n \quad (2)$$

In this case, the rate controller also selects the encoding mode t(I,n) for the frames. I-frames in particular are spread temporally so that multiple I-frames are not encountered in a particular super frame, and a high quality low-delay result is more easily achieved. One possible embodiment for t(I,n) is the following exemplary algorithm for a GOP having a sequence of IBPBPB:

$$\begin{aligned}t(l, n) &= I, \quad \text{if } (n - m(l) + N)\text{mod}N) = 0 \\ &= B, \quad \text{if } (n - m(l) + N)\text{mod}N)\text{mod}2 = 1 \\ &= P \quad \text{otherwise}\end{aligned}$$

where m(I)=startup offset for each program. For example if N=2 L, then the following applies:

m(1)=0 m(2)=2

...

m(x)=2(x−1)

...

m(L)=N−2

Of course, it is to be appreciated that other distributions can be selected, when N is or is not precisely a multiple of L, while maintaining the scope of the present principles.

Figure 4:
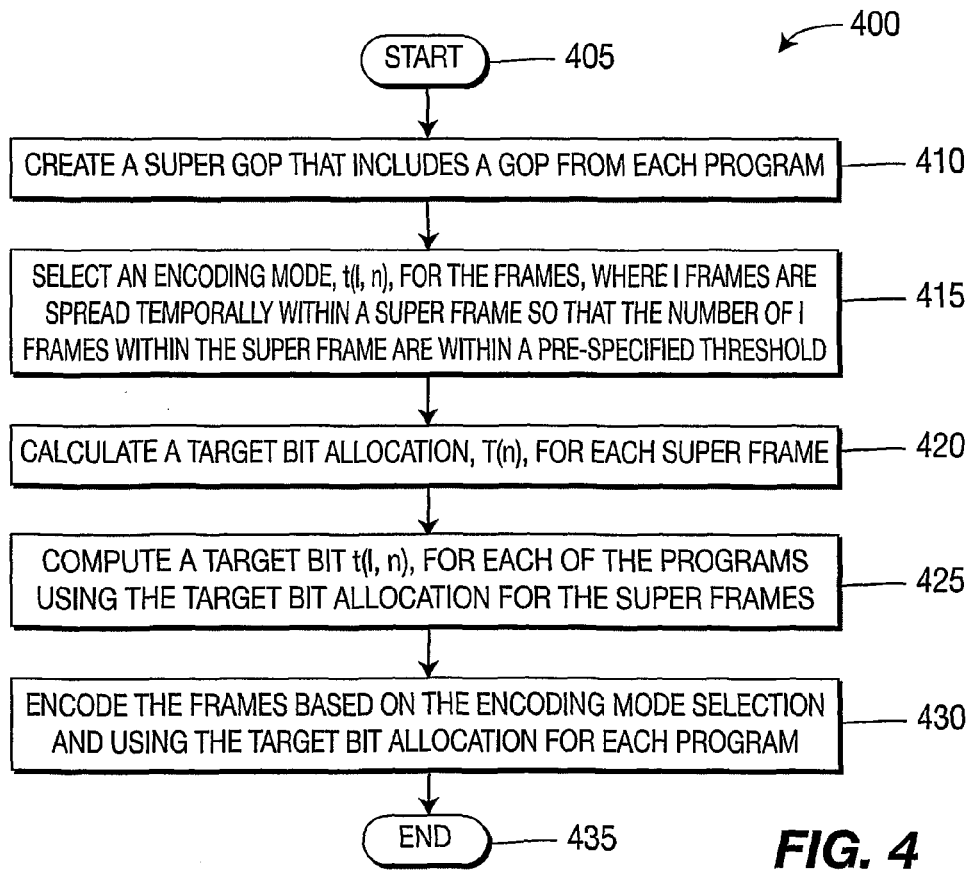
FIG. 4 is a flow diagram for an exemplary method for encoding a plurality of video streams for transmission over a single communication channel, in accordance with an embodiment of the present invention.

Turning to FIG. 4, an exemplary method for encoding a plurality of video streams for transmission over a single communication channel is indicated generally by the reference numeral 400. Each of the streams corresponds to a respective video program embodied therein. As noted above, it is presumed that there are L programs which can be jointly coded for a particular channel bandwidth. The method 400 provides an advantageous bit allocation over prior art encoding methods in determining a target bit allocation for each frame.

The method 400 includes a start block 405 that passes control to a function block 410. The function block 410 creates a super GOP that includes a GOP from each program, and passes control to a function block 415. For illustrative purposes, it is presumed that the GOP size for each stream is N. The function block 415 selects the encoding mode t(I,n) for the frames, and passes control to a function block 420. Regarding the selection process implemented by the function block 415, I-frames in particular are spread temporally so that multiple I-frames are not encountered in a particular super frame (e.g., the number of I-frames in a particular super frame is within a pre-specified threshold), and a high quality low-delay result is more easily achieved. The function block 420 calculates a target bit allocation, T(n), for each super frame (where each super frame is a set of frames that includes a frame from each of the L programs taken at the same time instant, i.e., having the same time index, each of the frames included in a super frame being also included in a corresponding super group of pictures), e.g., using Equation (1), and passes control to a function block 425. The function block 425 computes the target bit allocation, T(I,n), for each of the programs using the target bit allocation for the super frames, and passes control to a function block 430. Function block 425 may compute the target bit allocation for each of the programs using, e.g., Equation (2). Function block 430 encodes the frames based on the encoding mode selection (per function block 415) and target bit allocation for each program (per function block 425), and passes control to an end block 435.

A description will now be given of some of the many attendant advantages/features of the present invention, some of which have been previously described. For example, one advantage/feature is a video encoder for encoding a plurality of streams corresponding to a plurality of programs, wherein the video encoder includes an encoder for encoding each of the plurality of streams for transmission over a single communication channel. The encoder imposes a relative positioning on intra-coded frames among the plurality of programs to meet individual stream delay requirements corresponding to the plurality of streams. Another advantage/feature is the video encoder as described above, wherein the relative positioning on the intra-coded frames is imposed on a group of pictures (GOP) basis. Moreover, another advantage/feature is the video encoder as described above, wherein the relative positioning on the intra-coded frames is such that the intra-coded frames occur at different times in the plurality of programs. Further, another advantage/feature is the video encoder as described above, wherein the encoder creates a super group of pictures from the plurality of programs, and spreads the intra-coded frames temporally within super frames included in the super group of pictures while ensuring that an amount of the intra-coded frames within each of the super frames in the super group of pictures is within a pre-specified threshold amount. The super group of pictures include at least one group of pictures from each of the plurality of programs. Each of the super frames include a set of frames that have a same time index from across the plurality of programs.

These and other features and advantages of the present invention may be readily ascertained by one of ordinary skill in the pertinent art based on the teachings herein. It is to be understood that the teachings of the present invention may be implemented in various forms of hardware, software, firmware, special purpose processors, or combinations thereof.

Most preferably, the teachings of the present invention are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention.

Although the illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

The invention claimed is:

1. An apparatus for encoding a plurality of streams corresponding to a plurality of programs comprising: an encoder for encoding the plurality of streams for transmission over a communication channel; and a transmitter in signal communication with the encoder for transmitting the plurality of streams, wherein said encoder imposes a relative positioning on intra-coded frames among the plurality of programs to meet individual stream delay requirements corresponding to the plurality of streams such that the intra-coded frames occur at different times in the plurality of programs, and wherein the relative positioning is implemented in conjunction with a joint bit rate control jointly imposed on all of the plurality of streams with respect to a total channel bandwidth such that a picture type for the joint bit rate control is determined as a function of a frame position and a program number.

2. The apparatus of claim 1, wherein the relative positioning on the intra-coded frames is imposed on a group of pictures (GOP) basis.

3. The apparatus of claim 1, wherein said encoder creates a super group of pictures from the plurality of programs, and spreads the intra-coded frames temporally within super frames included in the super group of pictures while ensuring that an amount of the intra-coded frames within each of the super frames in the super group of pictures is within a pre-specified threshold amount, the super group of pictures including at least one group of pictures from each of the plurality of programs, each of the super frames including a set of frames that have a same time index from across the plurality of programs.

4. A method for encoding a plurality of streams corresponding to a plurality of programs, the method comprising encoding ones of the plurality of streams for transmission over a communication channel, wherein said encoding step comprises imposing a relative positioning on intra-coded frames among the plurality of programs to meet individual stream delay requirements corresponding to the plurality of streams such that the intra-coded frames occur at different times in the plurality of programs, and wherein the relative positioning is implemented in conjunction with a joint bit rate control jointly imposed on all of the plurality of streams with respect to a total channel bandwidth such that a picture type for the joint bit rate control is determined as a function of a frame position and a program number.

5. The method of claim 4, wherein the relative positioning on the intra-coded frames is imposed on a group of pictures (GOP) basis.

6. The method of claim 4, wherein said encoding step comprises:
creating a super group of pictures from the plurality of programs; and
spreading the intra-coded frames temporally within super frames included in the super group of pictures while ensuring that an amount of the intra-coded frames within each of the super frames in the super group of pictures is within a pre-specified threshold amount, the super group of pictures including at least one group of pictures from each of the plurality of programs, each of the super frames including a set of frames that have a same time index from across the plurality of programs.

7. A video processing method comprising: encoding each one of N video programs to provide N encoded video programs, where N>1; and transmitting said N encoded video programs over a channel; wherein said transmitting step temporally staggers intra-coded (I) frames among said N encoded video programs to minimize bitrate peaks over said channel such that the intra-coded frames occur at different times in the N encoded video programs, and wherein the temporal staggering is implemented in conjunction with a joint bit rate control jointly imposed on all of the N encoded video programs with respect to a total channel bandwidth such that a picture type for the joint bit rate control is determined as a function of a frame position and a program number.

8. An video processing apparatus comprising: means for encoding each one of N video programs to provide N encoded video programs, where N>1; and means for transmitting said N encoded video programs over a channel; wherein intra-coded (I) frames are temporally staggered among said N encoded video programs to minimize bitrate peaks over said channel such that the intra-coded frames occur at different times in the N encoded video programs, and wherein the temporal staggering is implemented in conjunction with a joint bit rate control jointly imposed on all of the N encoded video programs with respect to a total channel bandwidth such that a picture type for the joint bit rate control is determined as a function of a frame position and a program number.

* * * * *